United States Patent [19]

Lis

[11] Patent Number: 5,222,201
[45] Date of Patent: Jun. 22, 1993

[54] METHOD FOR DISPLAYING A PORTION OF THE BODY

[75] Inventor: Olivier Lis, Versailles, France

[73] Assignee: General Electric CGR SA, Issy les Moulineaux, France

[21] Appl. No.: 429,484

[22] Filed: Oct. 31, 1989

[30] Foreign Application Priority Data

Nov. 4, 1988 [FR] France .................. 88 14457

[51] Int. Cl.$^5$ .................. G06F 15/72; G06F 15/42
[52] U.S. Cl. .................. 395/120; 395/123; 395/124; 364/413.22; 364/413.19
[58] Field of Search ........ 395/120, 123, 124, 126, 395/127; 340/729; 364/413.22, 413.19, 413.16

[56] References Cited

U.S. PATENT DOCUMENTS

| | | | |
|---|---|---|---|
| 4,694,404 | 9/1987 | Meagher | 395/123 X |
| 4,710,876 | 12/1987 | Cline et al. | 364/413.22 |
| 4,858,149 | 8/1989 | Quarendon | 395/125 |
| 4,888,583 | 12/1989 | Ligocki et al. | 395/120 X |
| 4,987,554 | 1/1991 | Kaufman | 395/124 |
| 4,992,962 | 2/1991 | Ishida et al. | 395/121 |
| 5,038,302 | 8/1991 | Kaufman | 395/124 |

FOREIGN PATENT DOCUMENTS

204225 12/1986 European Pat. Off. .

OTHER PUBLICATIONS

Meagher, "High Speed Display of 3-D Medical Images Using Octree Encoding", Image Processing Laboratory, Rensselaer Polytechnic Institute, 1981.

Meagher, "Geometric Modeling Using Octree Encoding", Computer Graphics and Image Processing (Academic Press, Inc.), vol. 19, pp. 129–147, 1982.

Proceedings of the 7th Annual Conference of the IEEE/Engineering in Medicine and Biology Society, Chicago, Illinois, Sep. 27–30, 1985, vol. 1, pp. 612–615, IEEE, New York, US; D. J. Meagher.

Computer Vision, Graphics, and Image Processing, vol. 36, No. 1, Oct. 1986, pp. 100–113, Academic Press, Inc. Duluth, Minn., US; C. H. Chien, et al.

*Primary Examiner*—Gary V. Harkcom
*Assistant Examiner*—Raymond J. Bayerl
*Attorney, Agent, or Firm*—Nilles & Nilles

[57] ABSTRACT

The problems of selection of objects having complex shapes and usually apprehended by a plurality of facets are solved by making use of curved surfaces, the equation of which is of the second degree. In a test calculation for checking whether a node of an octree decomposition does or does not belong to the surface thus defined, the terms of the second degree are replaced by a constant. It is shown that this approximation permits rapid determination of the complex shapes without having to perform the calculations corresponding to the second degree. The method also permits easy determination of the normal to the object for calculation of shadowing when it is employed for display.

2 Claims, 2 Drawing Sheets

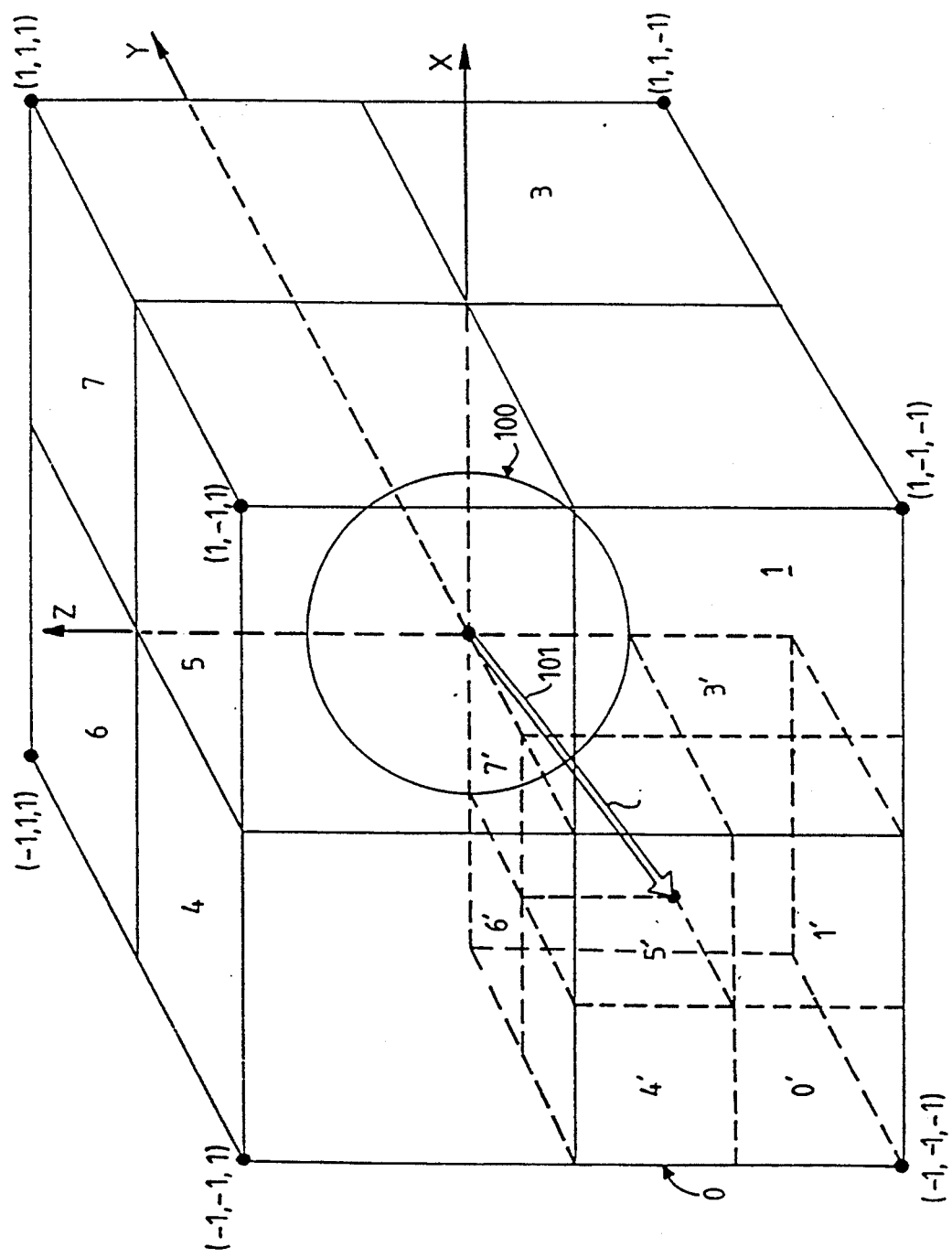
FIG_1

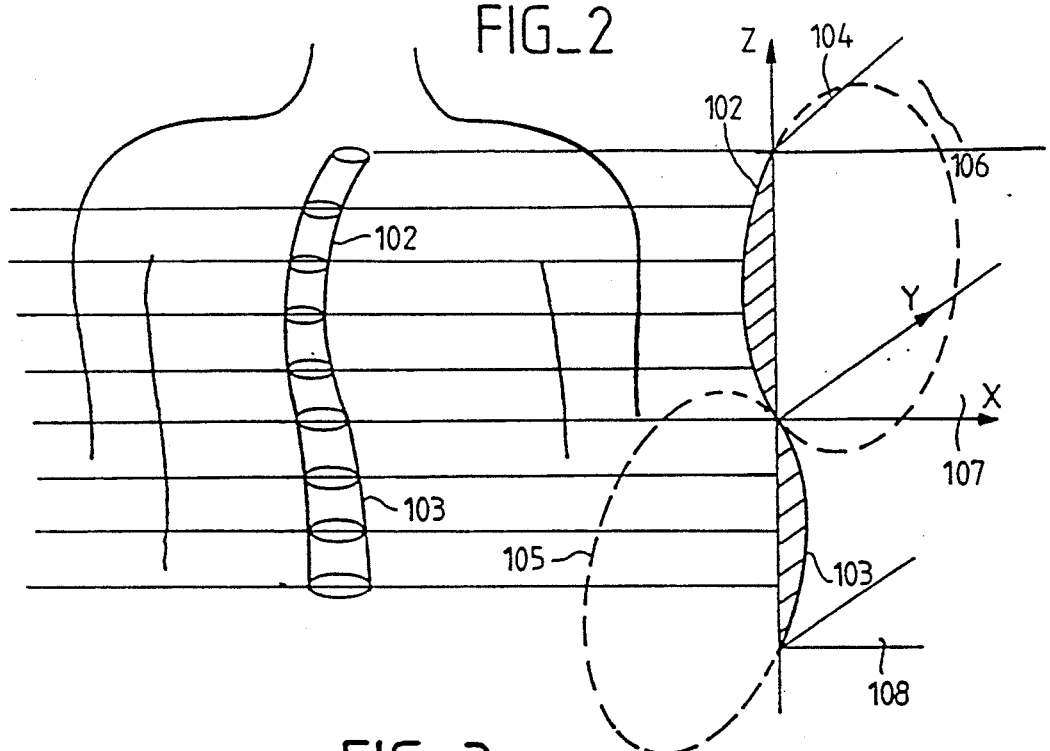
FIG_2
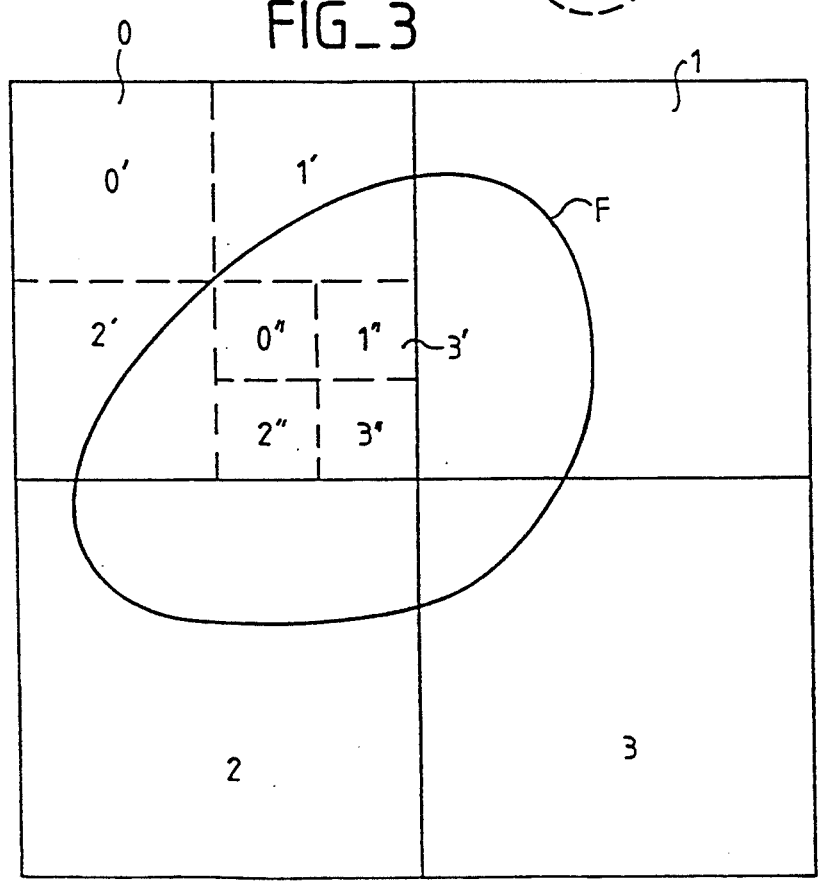
FIG_3

METHOD FOR DISPLAYING A PORTION OF THE BODY

BACKGROUND OF THE INVENTION

1. Field of the Invention

The present invention relates to a method of selection of an object in an N-dimensional frame of reference and to a method of display of the selected object. Selection of the object essentially consists in establishing the list of coordinates of the loci of the reference frame which are considered to be present in said object. It will be understood that the coordinates referred-to in the present invention have a broad meaning: they are in fact octree data organized in an object universe. These octree data, these coordinates, are obtained by decomposition of the universe in accordance with an octree method into father nodes and into son nodes of these father nodes. The invention is mainly directed to the treatment of objects coded numerically in arborescent form of the octree type. Subsequently to this treatment, the coded objects can be displayed, measured, etc . . . . The invention contributes to an improvement in subsequent treatments.

2. Description of the Prior Art

Numerical coding of images in an arborescent form usually referred-to as octree is well-known in many publications such as, for example, in the article by D. J. R. Meagher: "High-speed display of 3D medical images using octree encoding" which appeared in the September, 1981 issue of "Rensselaer Polytechnic Institute Technical Report", or else in the article by the same author entitled "Geometric modeling using octree encoding" which appeared in the review "Computer Graphics and Images Processing", No. 19, June, 1982, pages 129 to 147. As disclosed in U.S. Pat. No. 4,694,404 or in European patent Application published under No. 0,152,741, there is also known a method of three-dimensional (3D) display starting from images of an object coded in octree form. This method essentially consists in forming, from octree data organized in an object universe, the projection of said object in a target plane parallel to a viewing screen. Other methods are known which make it possible from a given octree decomposition to represent the object at another angle of incidence such as a ¾ rear view, for example, as well as with different lighting conditions.

But all these techniques have in common the utilization of objects already obtained by decomposition of the universe in accordance with an octree method. If necessary and under certain conditions, it is possible to devote attention only to certain parts of the objects thus selected. There are essentially known the partitions of the universe carried out from planes. In accordance with these partitions, portions of the object located on one side of a plane can be eliminated so as to apply the subsequent treatments only to the remaining portions. Furthermore, combinations of planes can lead to determination of restricted sub-universes. The partitions which are the easiest to carry out concern those which are oriented along the three axes of coordinates XYZ of the reference frame. In fact, the octree decomposition is carried out on a numerical volume. A numerical volume represents schematically an object to be studied or to be constructed. This object is defined by an item of information which is representative of a property of the object (in tomodensitometry, this property can be radiological density) associated with the coordinates of determination of the volume element of said object which has this property. The determination is a three-dimensional determination along the three axes XYZ. This determination corresponds to addresses in memories of the memory cells containing the corresponding items of information.

In a known manner, the addresses include address moments which are representative of each coordinate axis. One of the most simple partitions of the objects to be examined therefore consists in extracting from said object all the volume elements whose address moments are related to each other by a linear relation. In fact, such linear relations on the coordinates of the reference frame define planes. For example, it will be possible to extract all the volume elements whose first address moment, which is representative of the coordinate X, is positive.

The coordinates of a volume element in a decomposition of the octree type have a structure which is slightly different from that known in cartesian representation XYZ. A volume element or octant is defined by a composite address constituted as follows. In order to be able to decompose an object contained in a universe cube, a hierarchical dichotomy is performed. To this end, the cube is split into eight equal cubes by dividing said cube into two parallel to each of the six limiting principal planes. Each sub-cube can be similarly divided into eight sub-sub-cubes and so on. There is thus obtained a multilevel hierarchy at whose summit (level 0 by definition) is located the initial universe cube. The first sub-cubes are located at level 1, and so on. The initial cube is known as the father or father node of the eight sub-cubes which are known as son nodes. Each of these son sub-cubes is in turn the father of eight sub-sub-cubes, and so on. FIG. 1 represents this hierarchical dichotomy at the decomposition levels 0, 1 and 2. Decomposition of a cube is always performed by numbering the sub-cubes in the same manner. Thus in the principal cube shown, there are distinguished eight sub-cubes numbered from 0 to 7, the first four being located in a lower plane and the next four being located in an upper plane. Similarly, at the decomposition level number No. 2, the sub-cube 0 has been split up into eight sub-sub-cubes dimensioned 0' to 7'. These sub-cubes are arranged in the same manner as the sub-cubes dimensioned from 0 to 7 were arranged in the principal cube. This permanence of the partition entails the need, in a known manner in the octree technique, to preserve in the address of a node (of a cube at a given level) on the one hand the hierarchical level to which it belongs and on the other hand the respective coordinates of the centers of the son nodes. The result thereby achieved is that the partition of a numerical volume along its principal axes which is readily transposable to a partition according to the address moments of the representation of this numerical volume in memory, is also readily transposable to an octree decomposition of the object.

But a decomposition in planes is not always well adapted. For example, it may be required to display an eye in a numerical volume which is representative in medical engineering of an acquisition of the head. It is understood that it is preferable to approach, in the numerical volume, the shape of the eye by means of a sphere rather than a cube. Should it be desired, for example, to calculate the mean radiological density of said eye, the partition with planes is not very practical. It is possible to enhance the fineness of the representation with planes by creating multifacet volumes and by utilizing properties of inclined planes for extracting information relating to a round portion of an object. But this mode of representation has a disadvantage. It occupies data-processing machines for periods of time which are incompatible with work intentions in real time. In fact, a curved surface such as the eye is more closely imitated as the volume which approaches it has a larger number of facets. The calculation of the planes corresponding to these facets is longer as they are greater in number.

Moreover, the definition of curved surfaces in order to limit objects leads to equations of combination of the coordinates which are at least of the second degree in X, Y or Z. Without going into details, the object approach by curved surfaces requires calculation of multiplication operations by the treatment processors. Multiplication operations are unfortunately too time-consuming, especially if they are carried out on a large scale. These operations also preclude utilization in real time.

The object of the invention is to overcome these disadvantages by nevertheless proposing partitions with curved surfaces comprising, in their cartesian expression, terms of the second degree. But the invention provides a simplification such that it permits calculation in real time. In substance, by replacing in these expressions all the terms of the second degree by constants and by judiciously applying a change of reference frame at each change of hierarchical level of the octree decomposition, one can arrive at a simplified expression which makes it possible, as in the case of partition with planes, to take into consideration only those parts of the object which are located on the correct side with respect to the partition surface. The change of reference frame can be assimilated with an address shift. It will be shown on the one hand that it can be pre-calculated and on the other hand that it involves only binary addition and subtraction operations. The replacement of the terms of the second degree by a constant leads to elimination of all the multiplications which caused a waste of time. Furthermore, curved surfaces can be combined with each other in order to define complex volumes.

SUMMARY OF THE INVENTION

The invention is therefore directed to a method of selection of addresses which are representative of coordinates of an object in a so-called universe frame of reference, the coordinates of said object being obtained by decomposition of the universe, in accordance with an octree method, into father nodes and into son nodes of these father nodes, said object being limited in space by at least one surface or so-called primitive expressed by a primitive function comprising terms of the second degree, this obtainment comprising evaluation of the primitive function for each father node of the octree decomposition of the universe, this evaluation being associated with a full, empty or partial state attributed to a father node according to the values assumed by the primitive function at this stage of the decomposition, this method being distinguished by the fact that it comprises steps of replacement of the primitive function by a function of the first degree in which the terms of the second degree of the primitive function are replaced by a constant, a step of evaluation of said function of the first degree in order to determine the state of each father node and, when the state of a father node is partial, a step of change of reference of the reference frame of the type $x' = 2x - \epsilon_x$, in order to utilize for determining the state of each son node of said father node a function of the simple first degree deduced from said function of the first degree.

BRIEF DESCRIPTION OF THE DRAWINGS

FIG. 1 is a schematic representation of an octree decomposition.

FIG. 2 is an application of the invention in a medical case.

FIG. 3 is a schematic representation of certain effects of the invention.

DETAILED DESCRIPTION OF THE INVENTION

FIG. 1 shows a universe located with respect to a frame of reference XYZ. This universe is determined on a bounded support. It has the shape of a cube, the vertices of which have, for example, coordinates $x = \pm 1$, $y = \pm 1$ and $z = \pm 1$. In an octree decomposition, each node is evaluated in order to determine whether it has the required property or not. In order to simplify the explanation, the required property is, in the invention, the fact that the node is located totally, partially or not at all behind a given surface, the equation of which is known. In the invention, the distinctive property of this equation lies in the fact that it has terms of the second degree at xyz.

For example, in order to fix ideas, it will be sought to determine which nodes are located within a sphere 100 of unit diameter represented at the center of the cube of FIG. 1. The principal node, the entire universe, is not totally included within the sphere 100. This is visible since the sphere has on the contrary been purposely drawn so as to be smaller than the whole cube. In consequence, at the zero level, the principal node will be referred-to as partial. The decomposition of the principal node into eight son nodes numbered from 0 to 7 leads to the observation, based on a study of FIG. 1, that each of the nodes 0 to 7 is in turn only partially contained in the sphere 100. In consequence, each node which gives rise to an indetermination will in turn be split-up into son nodes.

By way of example, the node 0 has been split-up into eight son nodes numbered from 0' to 7'. With the aforementioned dimensions of the sphere, it is observed that only the node 7' is partly located within the sphere 100. The other nodes 0' to 6' are said to be empty since they are completely outside the sphere 100. There will then be carried out an additional decomposition (not shown) of the node 7' into nodes 0'' to 7''. It is evaluated intuitively, if the node 0'' is empty (it is completely outside the sphere 100), that the node 7'' is, on the contrary, full. It is completely inside the sphere 100. In the final analysis, if a node does not have any intersection with the volume which is internal to the surface, it is said to be empty and designated as E. If a node is entirely included in the surface, it is said to be full and designated as F. If a node is neither empty nor full, it is then said to be partial and is designated as P.

If a node is partial, it can again be subdivided and tests make it possible to define the states of the son nodes of this father node. This subdivision can terminate at any moment, either because the information (E, P, or F) is sufficient for the desired treatment, or even only possible, or because the number of successive subdivisions (also known as resolutions) is sufficiently large to dispense with the need for an additional subdivision.

Since the equation $F_1$ of the loci located on a particular side of a surface of the second degree is of the following type:

$$F_1 = ax^2 + by^2 + cz^2 + dyx + exz + fyz + gx + hy + iz + j \geq 0 \qquad \text{I}$$

It is apparent that the expression of the curved surface or so-called primitive thus has terms of the second degree in $x^2$, $y^2$, or $z^2$, or even terms of the second degree in xy, in xz or in yz. If it is desired to know whether a point of the universe, of the reference frame, is located on a particular side of this surface, it is verified that the inequality is satisfied for this point. It will be stated hereinafter that the primitive is full in respect of a given node if the inequality is satisfied in respect of all the points contained in said node. It will likewise be stated that the primitive is empty if the inequality is not satisfied in respect of all the points of said given node. A primitive is said to be neither empty nor full and the qualification of partial is attributed to the node concerned if the primitive is satisfied in respect of certain points of said node and if it is not satisfied in respect of certain other points. In accordance with the indications given earlier, the octree decomposition will be undertaken: from the node having a zero level to the node having the highest level in order to determine the nodes for which the primitive is satisfied and those for which it is not satisfied. The highest level can be determined beforehand or else can be determined during execution of the algorithm. By subsequently retaining solely those nodes for which the primitive is satisfied, there will have been carried out the selection of an object having the shape of the surface represented by the equation of the primitive indicated. The selection of this object is equivalent to having selected its coordinates in the octree decomposition. It is then wholly advantageous to select in a general object resulting from the octree decomposition of a numerical volume the nodes which have the same coordinates as those of the object thus selected.

As the expression appears in Equation I, the calculation of the function $F_1$ in respect of a node must be carried out in respect of all the values x y z of the loci belonging to said node. This involves considerable work. In the invention, starting from the fact that the universe is originally cubic (delimited, in accordance with the reference frame XYZ, by the points $-1-1-1$ to $+1+1+1$), it has been possible to deduce the fact that each coordinate would be lower than 1 at absolute value. A simplification was then carried out by writing:

$$G_1 = ax^2 + by^2 + cz^2 + dxy + exz + fyz + k \qquad \text{II}$$

In this formula, the coefficients a to f are the same as those which make it possible to define $F_1$ and the coefficient k represents a constant. Starting from the fact that the support for definition of the universe is bounded, it has accordingly been observed that there existed a particular value of k designated as $k_1$ such that $G_1$ is positive or zero irrespective of the value of x, y or z belonging to the bounded universe under study. In fact, it would only be necessary to choose for example $k_1$ such that $$k_1 \geq k = |a| + |b| + |c| + |d| + |e| + |f| \qquad \text{III}$$

but it would clearly be possible to choose another value of $k_1$. The important point to be noted here is that there certainly exists a value $k_1$ for which $G_1$ is positive or zero irrespective of the point of the bounded universe under study. It will be seen hereinafter how it is possible to refine the method by choosing certain particular values of $k_1$. It has also been observed that there existed in the same manner a value $k_2$ for which $G_1$ will be negative or zero, or even strictly negative, irrespective of the value of x or y or z, provided that they belong to the bounded universe as defined. If the determination of $k_1$ leads to the definition of $G_1$, it will be said that the definition of $k_2$ leads to the definition of an expression $G_2$ of the following form:

$$G_2 = ax^2 + by^2 + cz^2 + dxy + exz + fyz + k_2 \qquad \text{IV}$$

In practice, $k_1$ and $k_2$ can be so determined that $G_1$ and $G_2$ are zero at at least one point of the universe under study. But it can be shown that this is not necessarily the case. It is very important to observe that $k_1$ and $k_2$ depend only on coefficients a, b, c, d, e, f (coefficients of the terms of the second order of the expression of the curved surface of the primitive).

This simplification makes it possible to replace the writing of the primitive of formula I by the following writings according as it is desired to test whether the primitive is full or whether it is empty:

$$F_1 = G_1 + gx + hy + iz + j - k_1 \qquad \text{V}$$

$$F_1 = G_2 + gx + hy + iz + j - k_2 \qquad \text{VI}$$

The test which is intended to show that the primitive is full or that the primitive is empty may accordingly be replaced by a more simple test constituting a sufficient but not necessary condition. In this test, knowing that if $g_1$ is positive, it will be sufficient in order to guarantee that the primitive is full to ensure that:

$$gx + hy + iz + j - k_1 \geq 0$$

irrespective of the values of x, y and z which belong to the frame of reference. In point of fact, since the frame of reference is bounded by $-1$ and $+1$, this condition can itself be converted to another condition which is also sufficient but also not necessary:

$$-|g| - |h| - |i| + j - k_1 \geq 0 \qquad \text{VII}$$

Similarly, the determination that the primitive is empty will in fact consist in verifying that:

$$|g| + |h| + |i| + j - k_2 \geq 0 \qquad \text{VIII}$$

In these expressions, g, h, i and j are the values determined earlier for the primitive function $F_1$ indicated. It is observed that the primitive function $F_1$ cannot be simultaneously full and empty. In particular by reason of the fact that sufficient conditions have been chosen, the state of a full node will exist if Formula VII is verified and the state of an empty node will exist if Formula VIII is verified. In the other cases, where neither VII nor VIII are verified, the function $F_1$ can be partial, empty or full. It is then considered that a subdivision of this node into son nodes is necessary unless the highest level has been reached, in which case the node assumes the value determined beforehand for the nodes having a partial function $F_1$ at this level (full in practice). The fact of subdividing a node which would be full or empty because it has not been determined earlier by means of conditions VII and VIII is not objectionable for two reasons:

1) After subdivision, the son nodes will be determined in the same manner as before.

2) The sum of calculations to be carried out in addition can be perfectly limited for the choice of the most suitable constants $k_1$ and $k_2$:

$k_1$=the lowest value such that $G_1$ is positive or zero.
$K_2$=the highest value such that $G_2$ is negative.

In practice, for certain functions, half-spaces, spheres, for example, this case may appear only very exceptionally if the constants $k_1$ and $k_2$ are optimized as described in the foregoing.

In the event that a partial node is involved, as is the case with the zero level of the hierarchical dichotomy considered thus far, it is necessary to study the value of the function $F_1$ in the case of the son nodes of the father partial node thus found. In the present invention, it has been discovered that it was accordingly very useful, before determining the value of the primitive in the case of the son nodes, to effect a change of origin of the reference frame which makes it possible to locate the bounds of the son node (the vertices of the son node sub-cube). This change of reference frame numbered 101 in FIG. 1 consists in replacing the coordinates x y z of the points of the universe by coordinates x' y' z' given by:

$$\begin{aligned} x' &= 2x - \epsilon_x \\ y' &= 2y - \epsilon_y \\ z' &= 2z - \epsilon_z \end{aligned} \quad \text{IX}$$

In this expression $\epsilon$ has the values given by the following table according to the number of the son sub-cube concerned:

| No | $\epsilon_x$ | $\epsilon_y$ | $\epsilon_z$ | |
|---|---|---|---|---|
| 0 | +1 | +1 | +1 | |
| 1 | −1 | +1 | +1 | |
| 2 | +1 | −1 | +1 | |
| 3 | −1 | −1 | +1 | X |
| 4 | +1 | +1 | −1 | |
| 5 | −1 | +1 | −1 | |
| 6 | +1 | −1 | −1 | |
| 7 | −1 | −1 | −1 | |

It is found that, by proceeding in this manner, the change of variable consists in giving to the vertex of the son sub-cube 0 of the starting cube coordinates x' y' z' comprised between plus and minus one as before in the case of the coordinates x y z of the starting cube. Moreover, the choice of $\epsilon_x$, $\epsilon_y$ and $\epsilon_z$ is dictated by the position of the sub-cube within the father cube. Since the distribution of sub-cubes is invariable from a father cube to the son cubes which depend on this latter, the Table X can be employed continuously. Similarly, the change of variable IX can be carried out again in the case of the sub-cube 7', for example. In this change of variable, the center of the reference frame is displaced to the center of the cube 7'. In Equation IX, x' is in this case replaced by x'', x is replaced by x', and so on.

The expression of $F_1$, by replacing x, y and z by their values as a function of x', y' and z' results in an expression $F'_1$ of the same type as the expression of $F_1$. In the expression of $F'_1$, the coefficients a to j are replaced by coefficients a' to j' such that:

$$\begin{aligned} a' &= a \\ b' &= b \\ c' &= c \\ d' &= d \\ e' &= e \\ \text{and } f' &= f \end{aligned} \quad \text{XI}$$

$$\begin{aligned} g' &= 2g + 2a\,\epsilon_x + d\epsilon_y + e\epsilon_z \\ h' &= 2h + d\,\epsilon_x + 2b\,\epsilon_y + f\epsilon_z \\ i' &= 2i + e\,\epsilon_x + f\,\epsilon_y + 2c\,\epsilon_z \end{aligned} \quad \text{XII}$$

$$j' = 4j + a + b + c + d\epsilon_x\epsilon_y + e\epsilon_x\epsilon_z + f\epsilon_y\epsilon_z + 2g\epsilon_x + 2h\epsilon_y + 2i\epsilon_z \quad \text{XIII}$$

It is of interest to note that the change of variable thus effected leads to the definition of coefficients a' to f' which are equal respectively to the coefficients a to f. In consequence, the values of $G_1$ and of $G_2$ are not affected by this change of variable. The definitions of $k_1$ and of $k_2$ can be maintained exactly as they had been chosen at the outset.

Furthermore, the calculation of the coefficients g', h' and i' is a calculation which is performed without multiplication. This calculation is performed rather by multiplications of variable numbers (a to i) by numbers known beforehand 2 and $\epsilon_x$, $\epsilon_y$ and $\epsilon_z$. In point of fact, on the one hand the numbers known beforehand involve the simple operations of a multiplication and, on the other hand, the last of these numbers known beforehand do not entail the need for any multiplication but only for changes of sign. It can in fact be understood that it is much more rapid, for example, to carry out the operation $2b.\epsilon_y$ if only b has to be any indeterminate value than would be the case when carrying out multiplications of the type a.x.y if a, x and y can be indeterminate values. Moreover, the products of the type $\epsilon_x \epsilon_y$ can be pre-calculated in a table which is complementary to the table X. In fact, their values may be only +1 or −1.

The result achieved by this change of reference frame and by the use of the constants $k_1$ and $k_2$ is that the test on the function $F_1$ in the case of the son nodes is simple. It actually consists in carrying out the test of the formulae VII and VIII in which g, h, i and j are replaced by g', h', i' and j'. In the final analysis, by keeping in memory the hierarchical level under consideration, this accordingly avoids the need to test any value of x, y or z. It is apparent that the technique employed makes it possible to arrive rapidly at the full nodes of the universe represented in FIG. 1 without having performed complicated calculations.

The collection of these full nodes with their hierarchical level and their node number is a collection of node addresses which can be withdrawn from any numerical volume. By modifying the value of the coefficients a to j, it is possible to determine any curved surface of the second degree for which it is desired to know the full octants. It is only necessary in addition to displace this surface in order to superpose it in a numerical volume at any location, on an eye for the purpose of immediately acquiring information (relating to radiological density) corresponding to the nodes representing said location, the eye. It will be shown hereafter how this selection can be employed in addition for effecting the representation of the selected object.

The surface 100 is not necessarily a closed surface. In fact, it is possible (for example if the surface 100 is that of a paraboloid of revolution) that this surface may not be entirely located within the initial universe. It may be an open surface. This is not a matter of importance. In all cases, it is possible to determine which nodes of the universe are located on one side of said surface and which nodes are located on the other side. The feature of interest in the invention is the fact that the surface of partition of the universe is not necessarily flat. As in the state of the technique mentioned earlier, it is possible to associate a number of partitions together by Boolean operations of the union type, intersection type, complementary type and subtraction type.

FIG. 2 represents schematically a selection, in a numerical volume representing radiological density information acquired in the rib cage of an individual, of parts of his or her spinal column which are intersected by a curved surface. The representation of FIG. 2 thus makes it possible to conceive the possibility of replacing the central line of said spinal column by the trace of portions of two cylinders 102 and 103 which are curved in opposite directions with respect to each other. The cylinders have parallel generator-lines. The central line can be considered as located on circles 104 and 105 respectively. The circles 104 and 105 are secant to the center of the reference frame. The definition of the directrices of the cylindrical surfaces 102-103 of cross-section can be obtained by joining a portion of the circle 104 to another portion of the circle 103. The portion of the circle 104 can be limited on each side by planes 106 and 107. The plane 106 is parallel to the plane 107 which is the plane xy with z=0. Similarly, a portion of the circle 105 is located between the plane 107 and a plane 108. The plane 108 is symmetrical with the plane 106 with respect to the plane 107. The Boolean equation of the volume thus represented will be written as follows:

$$(104 \cap 106 \cap 107) \cup (107 \cap 105 \cap 108) \qquad \text{XIV}$$

In this expression, the function $F_1$ employed earlier will be replaced by a combination of functions $F_{104}$ and $F_{105}$ which are representative respectively of the circles 104 and 105. The definition of the function $F_{104}$ leads to the determination of two coefficients $k_1$ and $k_2$ relative to the circle 104. It will be observed that, in the upper portion of the figure, the planes 106 and 107 lead to simple primitive functions of the first order. In conclusion, a node will be of the full type for the portion 102 if it subscribes to the first portion of the Boolean union of formula XIV. Similarly, another node may be said to be full if it satisfies the conditions for the second member of the Boolean union of formula XIV. Determination of the relationship of a node to one of these two members involves three tests for determination of the full character and three tests for determination of the empty character. It could therefore be expected that it is necessary in the case of each node to carry out a total of twelve tests. However, Boolean algebra leads us to the following result in regard to the combination of functions.

| $\overline{F}$ | F | H | F∪H | F∩H |
|---|---|---|---|---|
| F | E | E | E | E |
| F | E | F | F | E |
| F | E | P | P | E |
| E | F | E | E | E |
| E | F | E | E | E |
| E | F | F | F | F |
| E | F | P | F | P |

XV

-continued

| $\overline{F}$ | F | H | F∪H | F∩H |
|---|---|---|---|---|
| P | P | E | P | F |
| P | P | F | F | P |
| P | P | P | P | P |

This table XV indicates for example that, if a node is supposed to be empty for one of the two primitives F or H, it is not necessary to evaluate the state of the other primitive for the same node if consideration is given to the intersection of these primitives. In fact, if F produces the result E (empty) in a given node, the result of the combination F∩H is automatically E. On the other hand in regard to the Boolean union, a node need only be full for a function in order to be full for joining these functions together. In the final analysis, it could be shown that this last finding appreciably limits the number of tests to be performed. Finally, if one of the primitives is empty or full and the other is partial, the subdivision of the node if necessary (result of the partial Boolean operation) will have to be carried out only in respect of this primitive. This considerably reduces the calculations to be made in the case of a large number of primitives.

The advantage of the method described is to permit determination of the presence (or absence) of an object within a complex surface constituted by primitives of the second degree. This makes it possible in addition, as a result of three-dimensional display of the object selected by known techniques, for example by emissions of rays or projections of quadtree on octree (along one of the three principal axes) or in accordance with any other method which makes use of the octree decomposition.

The Boolean operations between different objects can make it possible to display only those portions of numerical volumes which are contained within a volume defined by these different objects. Alternatively, they can make it possible to measure the characteristics of the included volume (measurement of mass, measurement of mean radiological density, ...).

For the three-dimensional display, the fact of visiting the octree arborescence makes it possible to obtain directly the normal to a surface. In fact, for any given resolution, the equation of the primitive whose surface it is desired to project is of the form of formula I (with associated changes of reference frame). A good approximation of a plane perpendicular to this primitive is the plane defined by:

$$gx + hy + iz = 0$$

The vector normal to this surface has the components g, h and i. This vector can be employed as the normal to the selected object at the location of the node considered. This vector must in any case be standardized before being combined with one or a number of the light sources employed for obtaining a shadowing value for the surface to be represented. The advantage of the method is therefore to provide very rapidly, in the form of complementary information, the direction of the vector normal to the selected surface. It is observed that the direction of the normal vector is constituted by the coefficients of the terms of the first degree of the simple function at the hierarchical level of the node concerned.

The technique described is a technique which makes it possible to produce at will an octree description of an object of the constructive solid geometry type (CSG) constructed from primitives of the second order. This method also applies to bi-dimensional cases for which the equations are obtained without difficulty. In fact, it is only necessary in all the preceding equations to replace z by zero in order to have the corresponding bi-dimensional expressions. The method may also be generalized to N dimensions.

FIG. 3 shows particularities of the definition of $k_1$ in a two-dimensional case. There is shown in this figure a form F. It is observed that the primitive is clearly partial in the case of the initial volume. After subdivision, the primitive is also partial in the case of each of the sub-squares zero to three. After supplementary division of the zero sub-square, it is found that the primitive is again partial in the case of the sub-sub-squares 1' and 2'. The coefficients g, h, i and j have been modified at each subdivision in accordance with the explanations presented earlier. The case of the sub-sub-cube 3' will be studied.

In certain cases, a primitive can be declared partial although it is strictly positive ($G_1$) or strictly negative ($G_2$) in the case of all the points of the node. This virtually leads to an indetermination related to the definition of $k_1$ or of $k_2$. However, this is not objectionable insofar as the partial primitives are each studied on sub-volumes of the volume in which they had been declared partial. Thus the sub-sub-cube 3' could be declared partial for the primitive function F whereas it is clearly completely included in this surface. This imprecision of the result is related to the imprecision of the determination of $k_1$ and $k_2$. It is an advantage from this point of view to take $k_1$ and $k_2$ as close as possible to the respectively minimum and maximum values assumed by the functions $F_1$. It is pointed out, however, that if the node 3' is erroneously declared partial, the son nodes of the node 3' will in turn be declared full, at least in regard to the nodes 1'', 2'' and 3''. The node 0'' may by imprecision of the method continue to be declared partial. In short, the technique according to the invention is more rapid but can in some cases lead to an imprecision of the contour of the selected object. This imprecision can be reduced by choosing values of $k_1$ and $k_2$ which are as adequate as possible.

What is claimed is:

1. A method for displaying an image of a portion of a physical body comprising:
    (A) irradiating said portion of said body and acquiring radiological density data about said portion of said body,
    (B) computing an octree object within a universe, said octree object being deduced from said radiological density data about said portion of said body acquired in said step (A),
    (C) applying an illumination to said octree object,
    (D) selecting addresses representative of coordinates of said octree object in a reference bound to said universe,
    the coordinates of said octree object being obtained by decomposition of said universe, in accordance with an octree method, into father nodes and into son nodes of said father nodes,
    said octree object being limited in space by at least one primitive surface expressed by a primitive function comprising terms of a second degree,
    said obtainment of said coordinates comprising evaluating said primitive function for each father node of said decomposition of said universe,
    said evaluation being associated with a full, empty or partial state attributed to a father node according to values assumed by said primitive function for said father node,
    wherein said method further includes
    (E) replacing said primitive function by a function of the first degree in which said terms of the second degree of said primitive function are replaced by a constant,
    (F) evaluating said function of the first degree in order to determine the state of each father node and, when the state of a father node is partial, changing reference from said reference to a new reference of the type $x'=2x-\epsilon_x$ in order to utilize, for determining the state of each son node of said father node, a simple function of the first degree, in which x is a coordinate of a son node in said reference, x' is a coordinate of the same son node in said new reference, $\epsilon_x$ being equal to $+1$ or $-1$ according to a position of said son node within the respective father node,
    (G) determining a normal direction of reflection of said illumination at each node by the coefficients of the terms of the first degree of said function of the first degree,
    (H) obtaining a shadowing value to be displayed for a node from said normal direction, and
    (I) displaying said image of said portion of said body by displaying said node with a luminosity dependent from said shadowing value.

2. A method according to claim 1 wherein:
    said octree object is limited by a combination of primitive surfaces expressed by primitive functions of the second degree,
    each primitive function is replaced by a function of the first degree associated with a constant,
    a corresponding combination of said functions of the first degree is evaluated, and, when the state of said father node is partial for said corresponding combination, a change of reference is carried out in accordance with a change of said type, $x'=2x-\epsilon_x$ in order to utilize, for determination of the state of each son node of said father node, a simple function of the first degree which is a combination of functions of the first degree deduced from said combination.

* * * * *